US010094932B2

(12) United States Patent
Bonel et al.

(10) Patent No.: US 10,094,932 B2
(45) Date of Patent: Oct. 9, 2018

(54) METHOD AND INTEGRITY VERIFICATION DEVICE LOCATION INFORMATION OBTAINED BY AT LEAST TWO SATELLITE GEOLOCATION DEVICES (71) Applicant: Thales, Courbevoie (FR)

(72) Inventors: Roland Bonel, Valence (FR); Jacques Coatantiec, Valence (FR); Sebastien Francois Philippe Legoll, Valence (FR)

(73) Assignee: THALES, Courbevoie (FR)

( * ) Notice: Subject to any disclaimer, the term of this patent is extended or adjusted under 35 U.S.C. 154(b) by 469 days.

(21) Appl. No.: 14/865,857

(22) Filed: Sep. 25, 2015

(65) Prior Publication Data
US 2016/0091611 A1 Mar. 31, 2016

(30) Foreign Application Priority Data
Sep. 25, 2014 (FR) ...................... 14 02156

(51) Int. Cl.
G01S 19/24 (2010.01)
G01S 19/20 (2010.01)
(Continued)

(52) U.S. Cl.
CPC .............. *G01S 19/24* (2013.01); *G01S 19/20* (2013.01); *G01S 19/40* (2013.01); *G01S 19/42* (2013.01)

(58) Field of Classification Search
CPC .......... G01S 19/24; G01S 19/20; G01S 19/40; G01S 19/42
(Continued)

(56) References Cited

U.S. PATENT DOCUMENTS 5,252,982 A * 10/1993 Frei .......................... G01S 19/44
342/352
5,945,943 A 8/1999 Kalafus et al.
(Continued)

FOREIGN PATENT DOCUMENTS

EP 2648017 A1 10/2013

OTHER PUBLICATIONS

Search Report for FR Application 1402156 dated Jun. 24, 2015.

Primary Examiner — Chuong P Nguyen
(74) Attorney, Agent, or Firm — Thompson Coburn LLP; Steven M. Ritchey (57) ABSTRACT The invention relates to a method and a device for verifying the integrity of position vector information obtained by at least two satellite geolocation devices, each of the geolocation devices being able to receive a plurality of wireless signals from a plurality of separate satellites, and to use the received wireless signals to compute a position vector of said geolocation device, including position coordinates computed in a predetermined spatial reference at a given moment in time, each of the geolocation devices being independent of the other geolocation devices, the satellites used being able to be different from one geolocation device to the next. The method includes, for at least one considered pair of geolocation devices made up of a first geolocation device ($G_m$) and a second geolocation device ($G_n$), computing (34) a deviation statistic between a first position vector computed by the first geolocation device and a second position vector computed by the second geolocation device, and computing (36) an alarm statistical threshold (S(m,n)) based on the deviation statistic and a first predetermined probability ($P_{FA}$). The method makes it possible to raise a malfunction alarm by using the computed alarm statistical threshold. The invention also makes it possible to compute (44), for at least one geolocation device of each pair of (Continued)

geolocation devices, an integrity radius from the alarm statistical threshold and a second predetermined probability ($P_{ND}$).

12 Claims, 4 Drawing Sheets

(51) Int. Cl.
  *G01S 19/42* (2010.01)
  *G01S 19/40* (2010.01)
(58) Field of Classification Search
  USPC .................. 342/357.63, 357.23, 357.25
  See application file for complete search history.

(56) References Cited

U.S. PATENT DOCUMENTS

| | | | |
|---|---|---|---|
| 6,373,432 B1 * | 4/2002 | Rabinowitz | G01S 19/04 342/3 |
| 6,377,892 B1 | 4/2002 | Johnson et al. | |
| 6,950,059 B2 * | 9/2005 | Rapoport | G01C 15/00 342/357.27 |
| 7,391,355 B2 * | 6/2008 | Mortimer | G01S 5/0018 342/107 |
| 7,869,949 B2 * | 1/2011 | Trautenberg | G01S 19/20 342/357.22 |
| 8,005,614 B2 * | 8/2011 | Dattler | G01C 21/20 244/194 |
| 8,847,820 B2 * | 9/2014 | Landau | G01S 19/04 342/357.66 |
| 9,146,322 B2 * | 9/2015 | Coatantiec | G01S 19/20 |
| 9,766,322 B2 * | 9/2017 | Taylor, Jr. | G01S 5/10 |
| 2008/0114544 A1 * | 5/2008 | Liu | G01C 21/165 701/480 |
| 2012/0004846 A1 * | 1/2012 | Coatantiec | G01C 21/165 701/470 |
| 2012/0154210 A1 * | 6/2012 | Landau | G01S 19/04 342/357.23 |
| 2015/0247928 A1 * | 9/2015 | Waters | G01S 19/03 342/357.4 |
| 2015/0362598 A1 * | 12/2015 | Rollet | G01S 19/15 701/17 |
| 2017/0170866 A1 * | 6/2017 | Rollet | H04B 1/709 |

\* cited by examiner

METHOD AND INTEGRITY VERIFICATION DEVICE LOCATION INFORMATION OBTAINED BY AT LEAST TWO SATELLITE GEOLOCATION DEVICES

The present invention relates to a method and device for verifying the integrity of position information obtained by at least two satellite geolocation devices.

The invention is situated in the field of platform navigation using satellite geolocation information, and in particular in the field of improving navigational safety in such a context.

Satellite geolocation is used in many civilian and military fields, in particular for aeronautic, maritime or land-based platform navigation.

In that context, in order to improve navigational safety, it is typical to use several geolocation devices, jointly referred to as GNSS (Global Navigation Satellite System) sensors, each sensor being able to receive wireless signals transmitted by a plurality of satellites and to provide, after computation, positioning information of the platform within a geographical reference. It is possible that one of the sensors used may malfunction, which could have serious consequences in terms of navigation. The geolocation devices are independent of one another. The satellites use can be different from one geolocation device to the next.

Thus, to ensure navigational safety, it is known to use several geolocation devices onboard a moving platform, and to perform monitoring in order to detect a potential malfunction of one of those geolocation devices.

Each geolocation device captures information sent in wireless signals transmitted by various satellites, and computes, for each satellite in view and from that received information, an estimate of the distance between the geolocation device itself and the satellite in view, that estimated distance also being called pseudo-range. The pseudo-range is different from the actual distance between the satellite in question and the geolocation device due to potential errors in the received information and the error in the internal clock geolocation device. Indeed, distance estimation uses dating of the data received via the internal clock of the geolocation device, and such an internal clock generally has an error, also called clock bias. From the estimated pseudo-ranges, relative to at least four separate satellites, a position of the geolocation receiver is computed using a least squares method.

When several geolocation devices exist in a system, generally for safety or availability reasons, an analysis is done of the coherence of the information provided by each of them.

According to one known solution, the monitoring is done by the navigational crew, in particular by the pilot and copilot, optionally with assistance provided by comparing the position information computed by the geolocation devices in pairs, and raising an alarm when the difference between two computed positions exceeds a determined alarm threshold.

Such a solution has several drawbacks. On the one hand, a significant cognitive load is imposed on the navigational crew, who must perform constant monitoring. On the other hand, in order to avoid an excessive number of false alarms, the determined alarm threshold must be relatively high. Indeed, if the geolocation devices used do not pick up wireless signals coming from exactly the same satellites, differences in atmospheric conditions may cause substantially different computed positions, without any malfunction.

Furthermore, setting a high alarm threshold causes a potential delay in the raising of an alarm in the case of malfunction, which may also have serious consequences on navigational safety.

There is therefore a need to improve the integrity verification of the position data and malfunction monitoring if multiple geolocation devices are used to determine the position of a moving platform.

To that end, the invention proposes a method for verifying the integrity of position vector information obtained by at least two satellite geolocation devices, each of the geolocation devices being able to receive a plurality of wireless signals from a plurality of separate satellites, and to use the received wireless signals to compute a position vector of said geolocation device, including position coordinates computed in a predetermined spatial reference at a given moment in time, each of the geolocation devices being independent of the other geolocation devices, the satellites used being able to be different from one geolocation device to the next.

The method includes, for at least one pair of considered geolocation devices made up of a first geolocation device and a second geolocation device, the following steps:
  obtaining, for each of the geolocation devices of said pair of geolocation devices, a set of positioning information,
  computing, using the positioning assemblies respectively associated with the first geolocation device and the second geolocation device, a deviation statistic between a first position vector computed by the first geolocation device and a second position vector computed by the second geolocation device,
  computing an alarm statistical threshold based on the deviation statistic and a first predetermined probability,
  determining a deviation value between at least part of the components extracted from the first computed position vector and the second computed position vector,
  comparing the determined deviation value to the alarm statistical threshold, and
  raising a malfunction alarm for one of the first and second geolocation devices when the determined deviation value exceeds the alarm statistical threshold,
  the alarm statistical threshold being such that in the absence of a malfunction on said first and second geolocation devices, the probability of a computed deviation value exceeding said alarm statistical threshold is lower than said first probability.

Advantageously, the invention makes it possible to compute an alarm statistical threshold, computed dynamically based on a determined false alarm probability.

The method according to the invention may have one or more of the features below, considered independently or in combination, according to all technically acceptable combinations.

The computation of a deviation statistic includes computing a variance matrix representative of the deviation statistic.

The positioning information for each geolocation device includes:
  an instantaneous position vector computed by said geolocation device,
  an error variance matrix on the computed spatial positions,
  a weighted observation matrix associated with satellites used to compute position vectors,
  and for each satellite used to compute said position vector, a value representative of the error standard deviation over a distance between said geolocation device and said satellite.

The positioning information for each geolocation device includes data making it possible to determine, for each satellite, an error standard deviation specific to the geolocation device and an error standard deviation shared by all of the geolocation devices, the error standard deviation over a distance between said geolocation device and said satellite being computed based on said specific error standard deviations and shared error standard deviations.

The positioning information further includes, for each geolocation device, a set of identifiers of the satellites used by said geolocation device.

The method includes, for each of said first and second geolocation devices, a step for extracting an observation matrix of the shared satellites from the corresponding weighted observation matrix, as a function of the identifiers of the satellites used both by the first geolocation device and the second geolocation device, said identifiers being obtained from respective identifier assemblies contained in the positioning information.

The variance matrix representative of a deviation statistic between the first position vector computed by the first geolocation device and the second position vector computed by the second geolocation device is computed using the formula:

$$P_{DIFF}(m,n) = P_m + P_n - P_m H_{m.c}^T \Delta H_{n.c} P_n - P_n H_{n.c}^T \Delta H_{m.c} P_m$$

wherein:

$P_m$ is the error variance matrix on the spatial positions computed for the first geolocation device and $P_n$ is the error variance matrix on the spatial positions computed for the second geolocation device, $H_{m.c}$ is the observation matrix of the shared satellites for the first geolocation device and $H_{n.c}$ is the observation matrix of the shared satellites for the second geolocation device, and $\Delta$ is a diagonal matrix whose terms are defined by:

$$\Delta(j,j) = \frac{\sqrt{\sigma_{comp,m}^2(j) - \sigma_{D,m}^2(j)} \sqrt{\sigma_{comp,m}^2(j) - \sigma_{D,n}^2(j)}}{\sigma_{comp,m}(j) \sigma_{comp,n}(j)}$$

Where $\sigma_{comp,m}(j)$ is the value representative of the error standard deviation over a distance between the first geolocation device and a satellite identified by an index j, $\sigma_{comp,n}(j)$ is the value representative of the error standard deviation over a distance between the second geolocation device and a satellite identified by an index j, $\sigma_{D,m}(j)$ is a value representative of the standard deviation of the error specific to the first geolocation device, over a distance between the first geolocation device and a satellite identified by an index j, $\sigma_{D,n}(j)$ is a value representative of the standard deviation of the error specific to the second geolocation device, over a distance between the second geolocation device and a satellite identified by an index j, said satellite with index j being shared by said first and second geolocation devices.

When said first and second geolocation devices use a same set of satellites, said variance matrix representative of a deviation statistic between the first position vector computed by the first geolocation device and the second position vector computed by the second geolocation device is computed using the formula:

$$P_{DIFF}(m,n) = P_m H_m^T D_m H_m P_m + P_n H_n^T D_n H_n P_n$$

wherein:

$P_m$ is the error variance matrix on the spatial positions computed for the first geolocation device and $P_n$ is the error variance matrix on the spatial positions computed for the second geolocation device, $H_m$ is the weighted observation matrix for the first geolocation device and $H_n$ is the weighted observation matrix for the second geolocation device, $D_m$ is a diagonal matrix, associated with the first geolocation device, whose terms are defined by:

$$D_m(i,i) = \frac{\sigma_{D,m}^2(i)}{\sigma_{comp,m}^2(i)}$$

Where $\sigma_{comp,m}(i)$ is the value representative of the error standard deviation over a distance between the first geolocation device and a satellite identified by an index i, $\sigma_{D,m}(i)$ is a value representative of the standard deviation of the error specific to the first geolocation device, over a distance between the first geolocation device and a satellite identified by an index i, $D_n$ is a diagonal matrix, associated with the second geolocation device, whose terms are defined by:

$$D_n(i,i) = \frac{\sigma_{D,n}^2(i)}{\sigma_{comp,n}^2(i)},$$

$\sigma_{comp,n}(i)$ is the value representative of the error standard deviation over a distance between the second geolocation device and a satellite identified by an index i, $\sigma_{D,n}(i)$ is a value representative of the standard deviation of the error specific to the second geolocation device, over a distance between the second geolocation device and a satellite identified by an index i.

The alarm statistical threshold is computed as a function of a Gaussian distribution probability centered on the deviation between position vectors computed with no malfunction of said first and second geolocation devices.

Each of the geolocation devices having an associated true position vector, the method further includes a step for computing an integrity radius, for at least one of the geolocation devices of the pair of geolocation devices, called processed geolocation device, for which a probability of malfunction or failure is known, said integrity radius being such that the probability of the deviation, for the chosen components, between the true position vector and the position vector computed by said processed geolocation device being above said radius, is below a second determined probability.

The computation of an integrity radius includes computing an intermediate radius, depending on the computed alarm statistical threshold and a first distance such that in the absence of malfunction on the other geolocation device of the pair of geolocation devices, the probability of having a deviation, for the selected components, between the true position vector and the position vector computed by said other geolocation device of the pair of geolocation devices, greater than said first distance, is lower than the second probability divided by the failure probability of the processed geolocation device.

The computation of the integrity radius includes selecting the maximum between said intermediate radius and a second distance, such that when there is no failure on the processed geolocation device, the probability of having a deviation, for the selected components, between the true position vector and the position vector computed by said processed geolocation device, greater than said second distance, is lower than the second probability.

According to another aspect, the invention proposes a device for verifying the integrity of position vector information obtained by at least two satellite geolocation devices, each of the geolocation devices being able to receive a plurality of wireless signals from a plurality of separate satellites, and to use the received wireless signals to compute a position vector of said geolocation device, including position coordinates computed in a predetermined spatial reference at a given moment in time, each of the geolocation devices being independent of the other geolocation devices, the satellites used being able to be different from one geolocation device to the next.

The device for verifying integrity includes, for at least one pair of considered geolocation devices made up of a first geolocation device and a second geolocation device, modules suitable for:
  obtaining, for each of the geolocation devices of said pair of geolocation devices, a set of positioning information,
  computing, using the positioning assemblies respectively associated with the first geolocation device and the second geolocation device, a deviation statistic between a first position vector computed by the first geolocation device and a second position vector computed by the second geolocation device,
  computing an alarm statistical threshold based on the deviation statistic and a first predetermined probability,
  determining a deviation value between at least part of the components extracted from the first computed position vector and the second computed position vector,
  comparing the determined deviation value to the alarm statistical threshold, and
  raising a malfunction alarm for one of the first and second geolocation devices when the determined deviation value exceeds the alarm statistical threshold,
  the alarm statistical threshold being such that in the absence of a malfunction on said first and second geolocation devices, the probability of a computed deviation value exceeding said alarm statistical threshold is lower than said first probability.

According to one embodiment, the module for computing a deviation statistic is capable of computing a variance matrix representative of the deviation statistic.

Other features and advantages of the invention will emerge from the description thereof provided below, for information and non-limitingly, in reference to the appended figures, in which.

Figure 1:
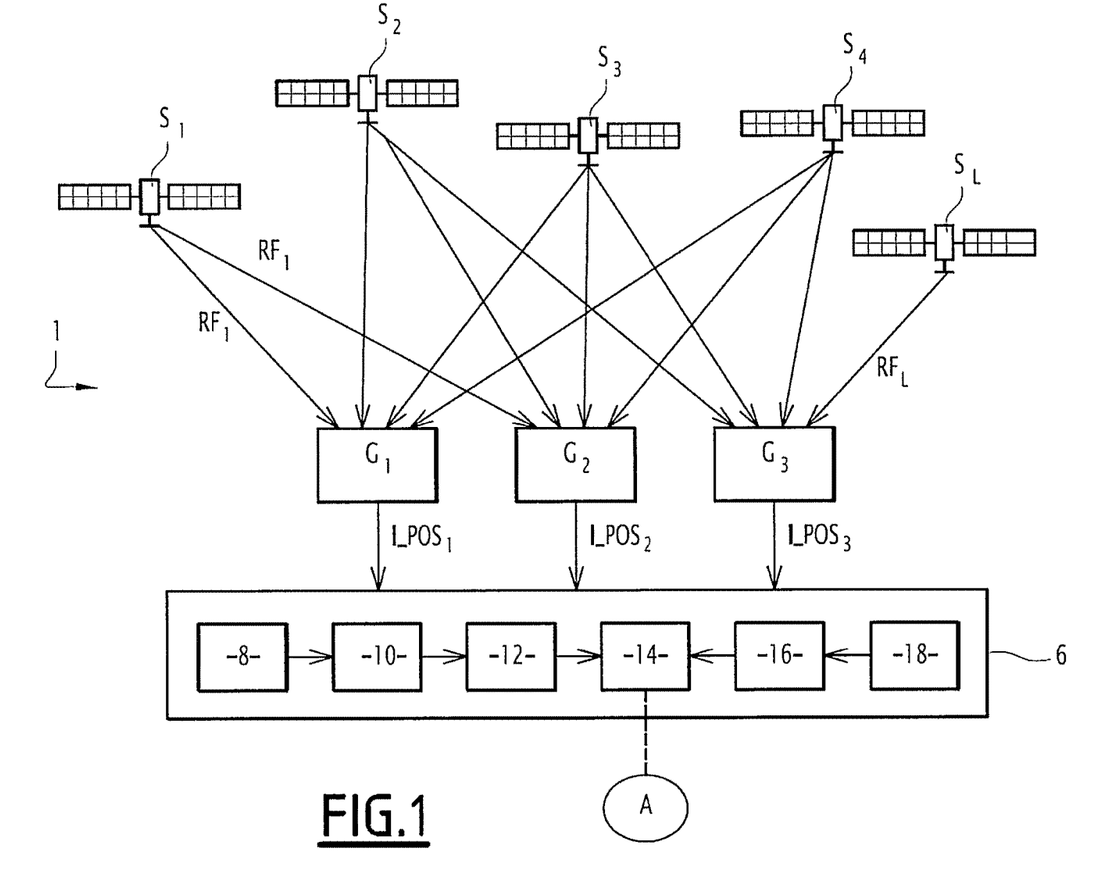
FIG. 1 diagrammatically shows a satellite geolocation system implementing a device for verifying the integrity of positioning information according to the invention.

FIG. 1 diagrammatically shows a satellite geolocation system 1 to which the invention is applicable.

The system 1 includes a platform (not shown), typically an aircraft, that includes three geolocation devices $G_1$, $G_2$, $G_3$, each of those devices implementing a GNSS sensor, for example using the GPS (Global Positioning System) or Galileo format.

In general, in a system implementing the invention, a platform carries a plurality of geolocation devices, including at least two such geolocation devices.

The geolocation devices are able to receive radio signals $RF_1$ to $RF_L$ sent by respective satellites $S_1, S_2, S_3, S_4, \ldots S_L$, those radio signals $R_1$ to $RF_L$ including spatiotemporal positioning information for the transmitting satellites.

The satellites $S_1$ to $S_L$ transmit in a given frequency band, for example in a frequency band comprised between 1.2 and 1.6 GHz for the GPS system.

In the example of FIG. 1, each geolocation device captures a set of four radio signals, depending on the transmission coverage of the transmitting satellites.

For each geolocation device, satellites are said to be "in view" or "visible" when radio signals are received from those satellites by said geolocation device. Thus, in the example of FIG. 1, the satellites $S_1, S_2, S_3, S_4$ are in view of the geolocation device $G_1$ and the geolocation device $G_2$, and the satellites $S_2, S_3, S_4, S_L$ are in view of the geolocation device $G_3$.

Hereinafter, it will be considered that the satellites of a GNSS geolocation system are each identified by an identifier, for example an index j, with j comprised between 1 and s, s being the number of operational satellites in orbit in the GNSS system used. The number of satellites in view of each geolocation device is less than or equal to s.

Each geolocation device $G_i$ estimates its position, at regular moments in time, and provides a position vector $POS_{calc.i}$ to four associated components, from $N_i$ satellites in view of the geolocation device $G_i$.

Figure 2:
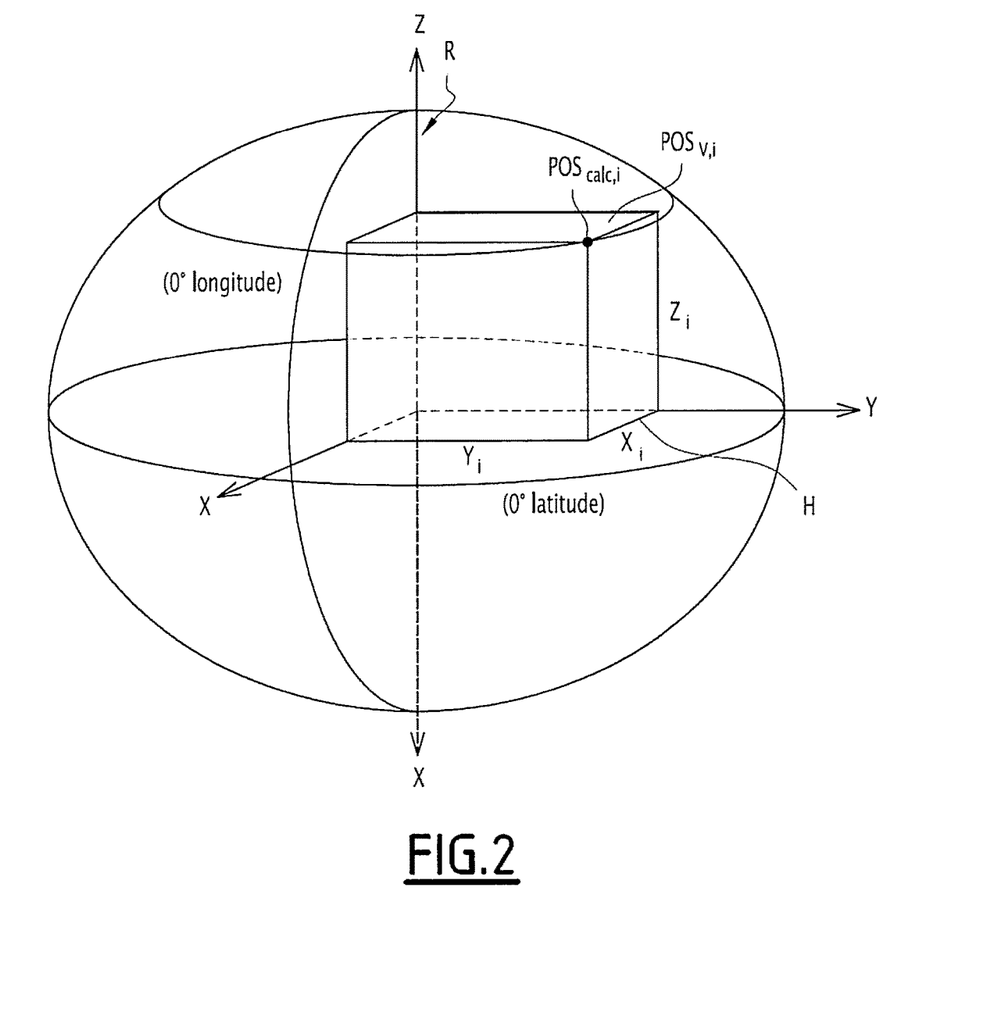
FIG. 2 diagrammatically shows a terrestrial orthonormal reference.

The first three components of the vector $POS_{calc.i}$ represent the coordinates $(X_i, Y_i, Z_i)$ of the geolocation device $G_i$ in a three-dimensional orthonormal reference R, which is for example the ECEF (Earth Centered, Earth Fixed) reference, as illustrated in FIG. 2.

The fourth component of the position vector is an estimate of the bias of the internal clock of the geolocation device $G_i$, expressed in unit of distance (time error multiplied by the speed of light), at the moment in time of the position computation.

Such a position vector is estimated conventionally in the field of satellite geolocation.

For a given geolocation device $G_i$, as indicated above, $POS_{calc.i}$ denotes the estimated position vector with four components, and $POS_{V.i}$ denotes the true position vector of the geolocation device in the considered orthonormal reference R, which is not known.

The clock bias corresponds to the error in seconds multiplied by the speed of light.

The respective position vectors are connected by the following relationship:

$$POS_{calc.i} = POS_{V.i} + (H_i^T H_i)^{-1} H_i^T B_i \quad (\text{Eq 1})$$

Where $H_i$ is an observation matrix of $N_i$ rows, $N_i$ being the number of satellites visible from the geolocation device $G_i$. The $j^{th}$ row of $H_i$ is equal to:

$$\frac{1}{\sigma_{comp,i}(j)}[a_j \quad b_j \quad c_j \quad 1]$$

With:
$\sigma_{comp,i}(j)$ the standard deviation of the error and the pseudo-range associated with the satellite with index j;

$\lfloor a_j \, b_j \, c_j \rfloor$ the unit vector of the axis connecting the satellite with index j and the geolocation device $G_i$ in the orthonormal reference R.

$B_i$ is a vector with $N_i$ components, representing the weighted errors on the pseudo-range of the satellites visible from the geolocation device $G_i$. The $j^{th}$ component of the vector $B_i$ is:

$$\frac{1}{\sigma_{comp,i}(j)} * Err_j$$

where $Err_j$ is the error over the pseudo-range between the geolocation device $G_i$ and the satellite with index j, due to the propagation of the radio signal $RF_j$ through the atmosphere.

The term $\sigma_{comp,i}(j)$ is computed by the geolocation device $G_i$, which also computes the matrix $H_i$.

The geolocation device $G_i$ computes a matrix $P_i$ that is a variance matrix of the error on the computed position:

$$P_i = E[(POS_{calc,i} - POS_{V,i})(POS_{calc,i} - POS_{V,i})^T] \quad \text{(Eq 2)}$$

Where the operator $E[X]$ designates the mathematical expectation of X, $A^T$ designates the matrix resulting from the transposition of a matrix A.

The diagonal terms of the matrix P are the variances of the errors and the computed components of the vector $POS_{calc,i}$ and the other terms represent the correlations between these different errors.

The matrix $P_i$ is equal to $P_i = (H_i^T H_i)^{-1}$ (Eq 3)

By combining (Eq 1) and (Eq 3), we obtain the formula:

$$POS_{calc,i} = POS_{V,i} + P_i H_i^T B_i \quad \text{(Eq 4)}$$

According to the invention, a device for verifying the integrity of positioning information 6, which includes computation means, e.g., one or more processors, compares the position vectors computed by at least two of the geolocation devices of the system 1, and performs a comparison relative to an alarm statistical threshold computed from a deviation statistic between two vectors extracted from the computed position vectors.

Each of the geolocation devices $G_1$, $G_2$, $G_3$ sends the device 6 for verifying the integrity of positioning information a set of computed positioning information, respectively denoted $I\_POS_1$, $I\_POS_2$, $I\_POS_3$.

More generally, the invention applies with a plurality of geolocation devices $G_i$.

Each set of positioning information $I\_POS_i$ comprises, for a geolocation device $G_i$, in the example embodiment: $\{POS_{calc,i}, P_i, H_i, N_i, \{\sigma_{comp,i}(j), j \in \delta(i)\}\}$, $POS_{calc,i}$ being the computed position vector, $P_i$ the variance matrix of the error and $POS_{calc,i}$, $H_i$ the weighted observation matrix associated with $POS_{calc,i}$ and $\sigma_{comp,i}(j)$ the standard deviation of the error over the pseudo-range associated with satellite j, computed by the geolocation device $G_i$. $\delta(i)$ is the set of $N_i$ satellite indices in view of the geolocation device $G_i$.

The device 6 for verifying the integrity of positioning information comprises a module 8 for computing a deviation statistic between position vectors computed by two separate geolocation devices, a module 10 for computing the statistical threshold, a comparison module 12, a module 14 for raising an alarm, a module 16 for verifying integrity and a module 18 for identifying a geolocation device that is malfunctioning.

The module 8 for computing a deviation statistic between position vectors computed by two separate devices computes, for two given geolocation devices $G_m$ and $G_n$, a matrix representative of the deviation statistic defined by the following covariance matrix:

$$P_{DIFF}(m,n) = E[(POS_{calc,m} - POS_{calc,n})(POS_{calc,m} - POS_{calc,n})^T] \quad \text{(Eq 5)}$$

In practice, the module 8 applies the following formula (Eq 6):

$$P_{DIFF}(m,n) = P_m + P_n - P_m H_{m,c}^T \Delta H_{n,c} P_n - P_n H_{n,c}^T \Delta H_{m,c} P_m \quad \text{(Eq 6)}$$

Wherein:

$H_{m,c}$ is the observation matrix of the shared satellites, determined by extracting the rows of the matrix $H_m$ corresponding to the shared satellites in the computations for the geolocation devices $G_m$ and $G_n$, in other words, the satellites simultaneously in view of the geolocation devices $G_m$, $G_n$.

$H_{n,c}$ is the observation matrix of the shared satellites, determined by extracting the rows of the matrix $H_n$ corresponding to the shared satellites in the computations for the devices $G_m$ and $G_n$, in other words, the satellites simultaneously in view of the geolocation devices $G_m$, $G_n$.

Indeed, hypothetically, each geolocation device $G_i$ receives information from a subset $\delta(i)$ from among this set of transmitter satellites of the GNSS system.

Considering two geolocation devices $G_m$ and $G_n$, the sets $\delta(m)$ and $\delta(n)$ include a number K of shared indices: $\delta(m,n) = \delta(m) \cap \delta(n)$ Hereinafter, a specific satellite will refer to a geolocation device $G_m$ ($G_n$, respectively) of the satellite whose index belongs to the set $\delta(m)$ ($\delta(n)$, respectively) and does not belong to the set $\delta(m,n)$, and shared satellite, for a pair of geolocation devices ($G_m$, $G_n$), a satellite whose index belongs to $\delta(m,n)$.

For example, in the system 1 of FIG. 1, the satellite $S_L$ is specific to $G_3$ and the satellites $S_2$, $S_3$, $S_4$ are shared by the pair of geolocation devices ($G_2$, $G_3$).

Thus, when the geolocation devices $G_m$ and $G_n$ have K indices in common, the matrices $H_{m,c}$ and $H_{n,c}$ are matrices of K rows and 4 columns.

The correspondence, for the matrix $H_{n,c}$, between a row number and the index of a satellite must be the same as for the matrix $H_{m,c}$.

The matrix $\Delta$ is a square matrix with size K×K, i.e., a diagonal matrix in which the diagonal terms are given by:

$$\Delta(j, j) = \frac{\sqrt{\sigma_{comp,m}^2(j) - \sigma_{D,m}^2(j)} \sqrt{\sigma_{comp,n}^2(j) - \sigma_{D,n}^2(j)}}{\sigma_{comp,m}(j)\sigma_{comp,n}(j)} \quad \text{(Eq 7)}$$

Where: the satellite j is a satellite shared by the two geolocation devices $G_m$ and $G_n$;

$\delta_{D,m}(j)$ is the standard deviation of the error, specific to the geolocation device $G_m$, and the pseudo-range associated with the satellite j;

$\delta_{D,n}(j)$ is the standard deviation of the error, specific to the geolocation device $G_n$, and the pseudo-range associated with the satellite j.

The correspondence, for the matrix Δ, between a row number and the index of a satellite must be the same as for the matrix $H_{m,c}$.

By definition, the errors and the GPS pseudo-ranges have known characteristics and it is known how to distinguish those that are specific to a given geolocation device from those that are shared by several places. The geolocation device determines the standard deviations of the various errors from information sent in the GPS message, from predetermined models.

The following relationships are verified:

$$\sigma_{comp,m}(j) = \sqrt{\sigma_{D,m}^2(j) + \sigma_c^2(j)} \quad \text{(Eq 8)}$$

$$\sigma_{comp,n}(j) = \sqrt{\sigma_{D,n}^2(j) + \sigma_c^2(j)} \quad \text{(Eq 8')}$$

With $\sigma_c(j)$ the standard deviation of the error over the pseudo-range associated with the satellite j, shared by the geolocation devices $G_m$ and $G_n$, for the part of the error shared by the two devices.

The formula (Eq 6) for computing $P_{Diff}(m,n)$ is obtained considering a breakdown of the respective weighted bias vectors for each of the geolocation devices $G_m$, $G_n$ with a particular bias of the specific satellites and particular bias of the shared satellites.

As noted below, according to formula (Eq 4) above, we have:

$$POS_{calc,m} = POS_{V,m} + P_m H_m^T B_m \quad \text{(Eq 9)}$$

$$POS_{calc,n} = POS_{V,n} + P_n H_n^T B_n \quad \text{(Eq 10)}$$

The deviation between computed position vectors is $\Delta POS(m,n) = POS_{calc,m} - POS_{calc,n}$ The respective true positions are identical, the geolocation devices being positioned on the same platform.

Thus, the deviation between the computed position vectors is written:

$$\Delta POS(m,n) = P_m H_m^T B_m - P_n H_n^T B_n \quad \text{(Eq 11)}$$

When there is no malfunction of the geolocation devices $G_m$, $G_n$, the difference $\Delta POS(m,n)$ follows a Gaussian normal distribution law.

The covariance matrix $P_{DIFF}(m,n) = E[\Delta Pos(m,n)\Delta POS(m,n)^T]$ completely characterizes the statistical distribution of the deviation between position vectors in that case.

By applying formulas (Eq 9) and (Eq 10) above, one obtains:

$$P_{DIFF}(m,n) = P_m + P_n - P_m H_m^T E[B_m B_n^T] H_n P_n - P_n H_n^T E[B_n B_m^T] H_m P_m \quad \text{(Eq 12)}$$

From the considerations listed above regarding the bias vectors $B_m$, $B_n$, the formula (Eq 12) can be written according to the used formula (Eq 6).

The covariance of the errors, and therefore the bias, between a satellite specific to one of the geolocation devices $G_m$, $G_n$ and a satellite shared by the respective geolocation devices $G_m$, $G_n$ is null. Likewise, the covariance of the errors between a satellite specific to a geolocation device $G_m$ and a satellite specific to a geolocation device $G_n$ is null.

For satellites shared by two geolocation devices, the errors are independent between two different satellites.

For a satellite shared by two geolocation devices $G_m$, $G_n$, the covariance between an error shared by the two geolocation devices $G_m$, $G_n$ and an error specific to one of the geolocation devices is null. Likewise, the covariance between an error specific to the geolocation device $G_m$ and an error specific to the geolocation device $G_n$ is null.

Taking the above considerations into account, one obtains the expression given by (Eq 7) of the terms of the matrix Δ.

In one particular embodiment, when the geolocation devices $G_m$ and $G_n$ use exactly the same satellites, i.e., when all of the satellites used by each of the geolocation devices are shared by the two geolocation devices, the matrices $H_{m,c}$ and $H_{n,c}$ are respectively equal to the matrices $H_m$ and $H_n$.

In that case, the formula (Eq 6) for computing the covariance matrix representative of the deviation statistic is transformed into:

$$P_{DIFF}(m,n) = P_m H_m^T D_m H_m P_m + P_n H_n^T D_n H_n P_n \quad \text{(Eq 13)}$$

Where $D_m$ and $D_n$ are respectively diagonal matrices defined by:

$$D_m(i,i) = \frac{\sigma_{D,m}^2(i)}{\sigma_{comp,m}^2(i)} \quad \text{(Eq 14)}$$

And $$D_n(i,i) = \frac{\sigma_{D,n}^2(i)}{\sigma_{comp,n}^2(i)} \quad \text{(Eq 15)}$$

Where the standard deviations $\sigma_{D,m}(i)$ and $\sigma_{D,n}(i)$ are respectively the standard deviation of the error and the pseudo-range associated with the satellite i specific to the geolocation device $G_m$ and $G_n$ defined above.

The module 10 for computing the alarm statistical threshold computes an alarm statistical threshold S(m,n) for each considered pair of geolocation devices ($G_m$, $G_n$), from the covariance matrix representative of the deviation statistic $P_{DIFF}(m,n)$ computed by the module 8.

The computation of the alarm statistical threshold S(m,n) uses the hypothesis that when there is no malfunction, the deviation on the position vector $\Delta POS(m,n)$ defined by (Eq 11) follows a Gaussian normal distribution law. Consequently, the matrix $P_{DIFF}(m,n)$ characterizes the statistical distribution of $\Delta POS(m,n)$ when there is no malfunction on the two geolocation devices $G_m$, $G_n$.

Depending on the user's needs, all four components of $\Delta POS(m,n)$ may be considered, or one, two or three components of $\Delta POS(m,n)$ may be extracted. Once the components have been chosen, the method according to the invention makes it possible to:

Deduce an alarm statistical threshold S(m,n),

Compute a deviation from components selected in $\Delta POS(m,n)$,

The value of the alarm statistical threshold S(m,n) is as low as possible, while respecting the following property:

When there is no failure of the geolocation device $G_m$ and $G_n$, the probability that the computed deviation is above the alarm statistical threshold S(m,n) is lower than a determined false alarm probability $P_{FA}$.

For example, if the choice of the components in $\Delta POS(m,n)$ corresponds to the two horizontal position error components, it is possible to compute an alarm statistical threshold S(m,n).

The deviation from the components selected in $\Delta POS(m,n)$ then corresponds to the deviation, in a horizontal plane, between two computed positions respectively associated with the geolocation devices $G_m$ and $G_n$.

When there is no failure of the geolocation device $G_m$ and $G_n$, the probability that said position deviation in the horizontal plane is above the statistical alarm threshold S(m,n) is lower than a determined probability of false alarm $P_{FA}$.

The comparison module 12 computes a deviation from components selected within $\Delta POS(m,n)$.

Depending on the user's needs, all four components of ΔPOS(m,n) may be considered, or one, two or three components of ΔPOS(m,n) may be extracted.

If these components are denoted $A_1(m,n), \ldots A_k(m,n)$, k being the number of selected components, the computed deviation is given by the root of the sums of the squares of those components, by:

$$d_h(m,n) = |\sqrt{A_1(m,n)^2 + \ldots + A_k(m,n)^2}| \quad \text{(Eq 16)}$$

This deviation is compared to the alarm statistical threshold S(m,n) depending on the determined first probability (probability of false alarm) $P_{FA}$.

The module 14 for raising an alarm is able to raise an alarm A indicating a likely malfunction of at least one of the two geolocation devices $G_m$, $G_n$ when the deviation $d_h(m,n)$ is above the alarm statistical threshold S(m,n).

The integrity verification module 16 is able to perform an integrity radius computation, for a given geolocation device $G_m$, for which the probability of malfunction or failure $P_{panne}(m)$ is known, associated with a second determined probability $P_{ND}$, $P_{ND}$ being the probability of non-detection.

The integrity radius is defined as a radius R(m), such as the likelihood of the deviation, for the selected components, between the true position vector and the position vector computed by the geolocation device $G_m$ being greater than said radius R(m), is less than the second determined probability $P_{ND}$. This radius makes it possible to limit the impact of a failure of the geolocation device $G_m$ on the position vector computed by the geolocation device $G_m$.

The computation of the integrity radius uses the alarm threshold S(m,n) computed for the pair of geolocation devices $G_m$, $G_n$.

A module 18 for identifying a malfunctioning geolocation device recovers the results of the comparison module 12 at the alarm statistical threshold for at least three geolocation devices considered in pairs, and provides, when the results allow it, an indication of the malfunctioning geolocation device.

Indeed, considering three geolocation devices $G_m$, $G_n$, $G_p$:
the alarm statistical thresholds S(m,n), S(m,p) and S(n,p) are computed for the pairs $(G_m, G_n)$, $(G_m, G_p)$ and $(G_n, G_p)$
the deviations are computed from the components selected within ΔPOS(m,n), ΔPOS(m,p), ΔPOS(n,p)
Each deviation is compared to its respective alarm threshold (the deviation computed from ΔPOS(m,n) is compared to the threshold S(m,n), and so forth).
When an alarm is raised for the pair $(G_m, G_n)$ and for the pair $(G_m, G_p)$, but not for the pair $(G_n, G_p)$, the module 18 for identifying the malfunctioning geolocation device deduces that the geolocation device $G_m$ is malfunctioning.

This information is sent to the geolocation computation device, in order to exclude the geolocation device detected as malfunctioning from the position computations of the platform.

Figure 3:
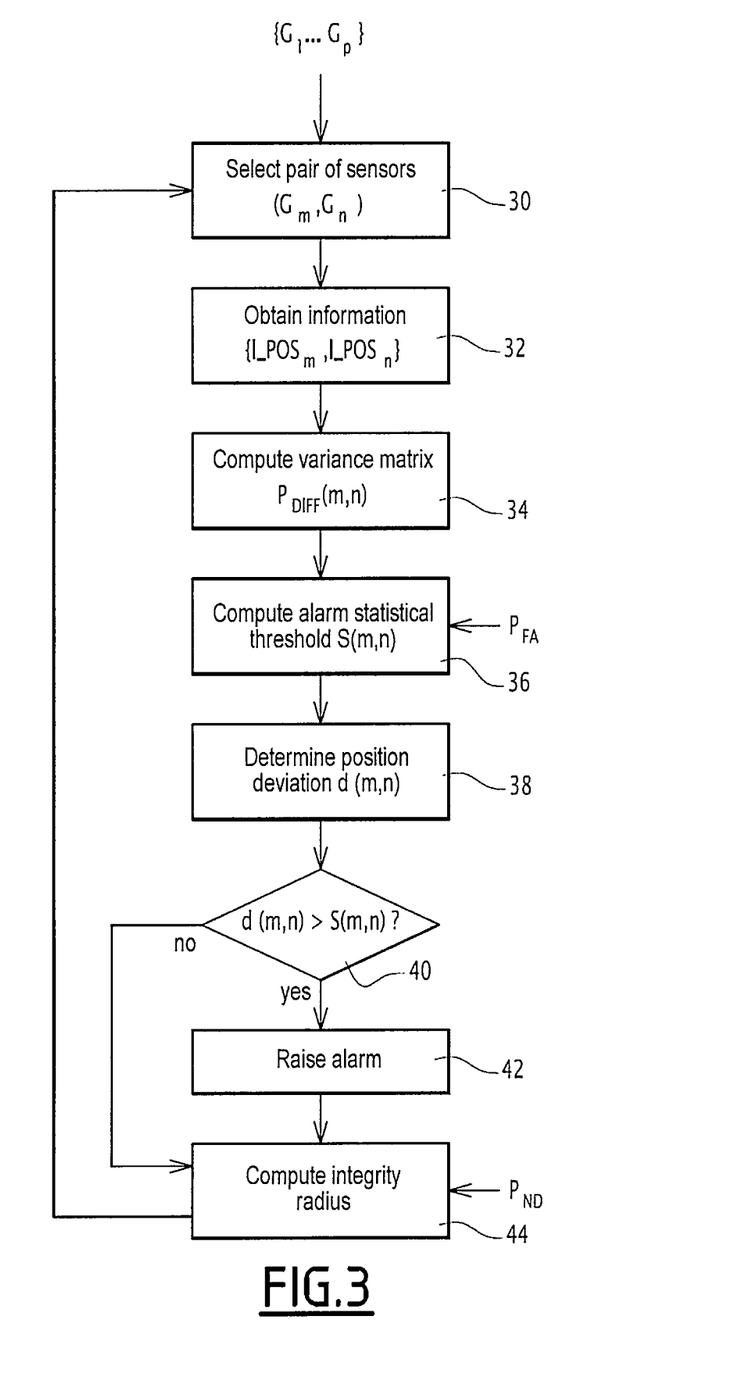
FIG. 3 is a summary of the main steps of a method for verifying the integrity of position information according to one embodiment of the invention.

FIG. 3 illustrates the main steps of a method for verifying the integrity of position information according to one embodiment of the invention, implemented by a computation unit of a programmable device able to carry out the invention.

A set of key geolocation devices $\{G_1, \ldots, G_P\}$, P≥2 is present on a platform implementing the geolocation for navigation.

During a first selection step 30, a pair of geolocation devices $(G_m, G_n)$ is selected, and positioning information I_POS$_m$, I_POS$_n$ is obtained from the geolocation devices $G_m$, $G_n$.

Preferably, the positioning information of the various devices is received at regular moments in time and stored in a memory of the programmable device implementing the invention.

The positioning information respectively comprises one said instantaneous position vector POS$_{calc.m}$, POS$_{calc.n}$, an error variance matrix on the computed position vectors $P_m$, $P_n$, a weighted observation matrix $H_m$, $H_n$ associated with the satellites used to compute the position vectors, and for each of said separate satellites used, a value $\sigma_{comp.m}(j)$, $\sigma_{D.m}(j)$, $\sigma_{comp.n}(j)$, $\sigma_{D.n}(j)$.

$\sigma_{comp.m}(j)$ and $\sigma_{comp.n}(j)$ are representative of the error standard deviation over a distance between said geolocation device and the satellite with index j.

$\sigma_{D.m}(j)$ and $\sigma_{D.n}(j)$ are representative of the standard deviation of the error specific to the geolocation device $G_m$ and $G_n$, over the pseudo-range associated with the satellite j.

Optionally, a set of identifiers δ(m), δ(n) of the different satellites used is provided. It should be noted that such a set is not necessary when the geolocation devices use the same sets of satellites.

Preferably, the identifiers of the satellites δ(m), δ(n) are satellite indices.

A variance matrix representative of a deviation statistic between the position vectors POS$_{calc.m}$ and POS$_{calc.n}$, denoted $P_{DIFF}(m,n)$, is computed during the computation step 34, according to the formula of equation (Eq 6) or according to the formula of equation (Eq 13). Two embodiments of this computation are outlined below in reference to FIGS. 4 and 5.

Next, an alarm statistical threshold S(m,n) is computed, based on a first probability $P_{FA}$ and components selected within ΔPOS(m,n), during the step for computing the threshold 36, based on a Gaussian normal distribution and variance extracted from $P_{DIFF}(m,n)$.

Next, a deviation value relative to the selected components within ΔPOS(m,n), denoted d(m,n), is determined during step 38.

Preferably, the deviation is estimated according to the formula of equation (Eq 16) above.

The determined deviation value d(m,n) is compared to the alarm statistical threshold S(m,n) during the comparison step 40.

If the determined deviation value d(m,n) exceeds the alarm statistical threshold S(m,n), then an alarm is raised during the alarm raising step 42.

The alarm is preferably indicated via a man-machine interface of the programmable device implementing the invention or an associated device. For example, a visual indicator is displayed on a display interface. Alternatively, an audible alarm is raised.

The step 42 for raising the alarm or the comparison step 40 in case of negative comparison is followed by a step 44 for computing an integrity radius, for one of the two geolocation devices or for both.

For example, the computation is applied for the geolocation device $G_m$, called processed geolocation device for the integrity computation.

During that step, an intermediate radius is first computed:

$$R_p = \max(S(m,n), d(m,n)) + R_{FF.n} \quad \text{(Eq 17)}$$

Where $R_{FF.n}$ is the distance, called first distance, such that in the absence of a malfunction on the geolocation device $G_n$, the probability of having a deviation, for the selected components, between the true position vector POS$_{V.n}$ and the computed position vector POS$_{CALC.n}$ greater than $R_{FF.n}$ s lower than the second probability (non-detection probability) $P_{ND}$ divided by the failure probability $P_{panne}(m)$.

One next computes:

$$R(m) = \max(R_p, R_{FF.m}) \tag{Eq 18}$$

Where $R_{FF.m}$ is the distance, called second distance, that has the following property: when there is no malfunction on the geolocation device $G_m$, the probability of having a deviation, for the selected components, between the true position vector $POS_{V.m}$ and the computed position vector $POS_{CALC.m}$ greater than $R_{FF.m}$ is lower than the second probability (non-detection probability) $P_{ND}$.

Thus, regardless of whether the alarm has been raised in the step 42 for raising an alarm, the probability of having a deviation of the selected components, between the true position vector $POS_{V.m}$ and the computed position vector $POS_{CALC.m}$, greater than $R(m)$ is lower than the second probability (non-detection probability) $P_{ND}$.

Alternatively, the computation of the integrity radius is also applied to the geolocation device $G_n$.

Step 44 is next followed by step 30, already described, for selecting a new pair of geolocation devices.

Preferably, all possible pairs of geolocation devices are considered.

Figure 4:
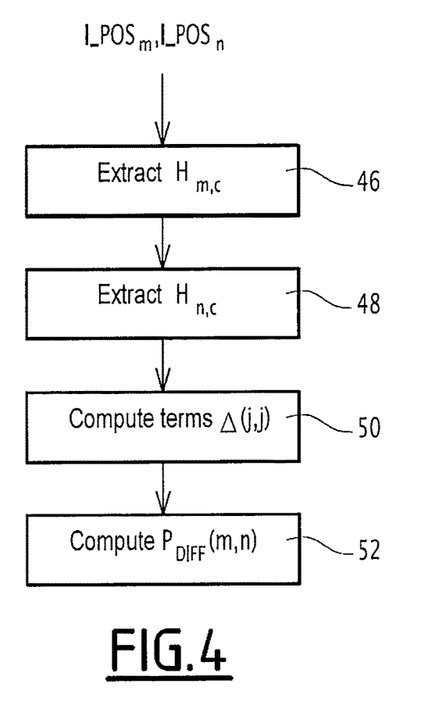
FIG. 4 is a summary of the main steps for computing a variance matrix according to a first embodiment.

FIG. 4 illustrates a first embodiment of the step 34 for computing the variance matrix.

The positioning information respectively comprises, in this embodiment:
an instantaneous position vector $POS_{calc.m}$, $POS_{calc.n}$,
an error variance matrix over these computed position vectors $P_m$, $P_n$,
a weighted observation matrix $H_m$, $H_n$ associated with the satellites used to compute the position vectors, and
for each of said different satellites used,
    a value $\sigma_{comp.m}(j)$, $\sigma_{comp.n}(j)$ representative of the error standard deviation over a distance between said geolocation device and the satellite with index j,
    values $\sigma_{D.m}(j)$ and $\sigma_{D.n}(j)$ representative of the standard deviation of the error specific to the geolocation device $G_m$ and $G_n$, over the pseudo-range associated with the satellite j,
a set of identifiers $\delta(m)$, $\delta(n)$ of the different satellites used.

During steps 46, 48, sub-matrices for observation of shared satellites for each of the geolocation devices, $H_{m.c}$ and $H_{n.c}$, respectively, are extracted from the matrices $H_m$ and $H_n$, by extracting the rows associated with the satellites shared by the sets of identifiers $\delta(m)$ and $\delta(n)$.

During step 50, the terms $\Delta(j,j)$ for all of the satellite indices $j \in \delta(m,n)$ are computed, according to formula (Eq 7).

Lastly, the formula (Eq 6) is implemented during step 52 to compute the variance matrix $P_{DIFF}(m,n)$ representative of the deviation statistic between computed position vectors.

Figure 5:
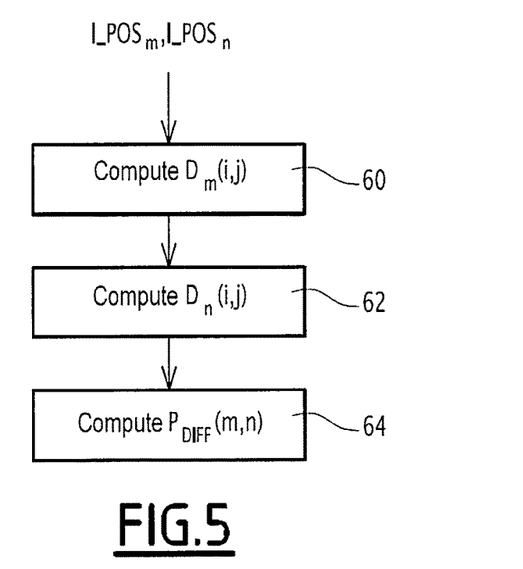
FIG. 5 is a summary of the main steps for computing a variance matrix according to a second embodiment.

FIG. 5 illustrates a second embodiment of the step 34 for computing the variance matrix.

The positioning information respectively comprises, in this embodiment:
an instantaneous position vector $POS_{calc.m}$, $POS_{calc.n}$,
an error variance matrix on the computed position vectors $P_m$, $P_n$,
a weighted observation matrix $H_m$, $H_n$ associated with the satellites used to compute position vectors, and
for each of said separate satellites used,
    a value $\sigma_{comp.m}(j)$, $\sigma_{comp.n}(j)$ representative of the error standard deviation over a distance between said geolocation device and said satellite with index j, and
    values $\sigma_{D.m}(j)$ and $\sigma_{D.n}(j)$ representative of the standard deviation of the error specific to the geolocation device $G_m$ and $G_n$, over the pseudo-range associated with the satellite j.

In this embodiment, by definition, all of the satellites used for the geolocation devices are shared satellites.

During step 60, the terms $D_m(j,j)$ are computed according to formula (Eq 14) for all of the satellites used.

The terms $D_n(j,j)$ are computed according to formula (Eq 15) for all of the satellites used during step 62.

During a computation step 64, the formula (Eq 13) is implemented to compute the variance matrix representative of the deviation statistic between the computed position vectors $P_{DIFF}(m,n)$.

Advantageously, in both embodiments, the taking into account of shared satellites used by the geolocation devices of a pair of geolocation devices makes it possible to account for data affected by similar propagation errors, which have a similar impact on the computed positions.

Thus, the computed alarm statistical threshold value is as low as possible, making it possible to raise an alarm as early as possible and therefore increase navigational safety.

Advantageously, the invention makes it possible to compute, for each geolocation device $G_m$ for which the probability of a malfunction or failure $P_{panne}(m)$ is known, an integrity radius $R(m)$ such as the probability of having a deviation, for the selected components, between the true position vector $POS_{V.m}$ and the computed position vector $POS_{calc.m}$ greater than $R(m)$, is lower than a probability of non-detection $P_{ND}$. Advantageously, the invention makes it possible to compute an alarm statistical threshold, computed dynamically based on a determined false alarm probability.

Advantageously, for a determined false alarm probability $P_{FA}$, this threshold has as low a value as possible, while being characterized in that when there is no malfunction on two devices, the probability of having a computed deviation value between those two devices exceeding the threshold is lower than the false alarm probability. Having as low a value as possible makes it possible to raise an alarm as early as possible and therefore to increase navigational safety.

The invention claimed is:

1. A method for verifying the integrity of position vector information obtained by at least two satellite geolocation devices carried by a moving platform, the position vector information being used for calculating a geolocation position of the moving platform, the geolocation position being used for navigating the moving platform, each of the geolocation devices being able to receive a plurality of radio signals from a plurality of separate satellites, and to use the received radio signals to compute a position vector of said geolocation device, including position coordinates computed in a predetermined spatial reference at a given moment in time, each of the geolocation devices being independent of the other geolocation devices, the satellites used being able to be different from one geolocation device to the next, the method comprising, for at least one pair of considered geolocation devices made up of a first geolocation device and a second geolocation device, the following steps implemented by a processor of a geolocation computation device:
    obtaining, for each of the geolocation devices of said pair of geolocation devices, a set of positioning information,
    computing, using the information positioning assemblies respectively associated with the first geolocation device and the second geolocation device, a deviation statistic between a first position vector computed by the first geolocation device and a second position vector computed by the second geolocation device, computing an alarm statistical threshold based on the deviation statistic and a first predetermined probability, determining a deviation value between at least part of the components extracted from the first computed position vector and the second computed position vector, comparing the determined deviation value to the alarm statistical threshold, and raising a malfunction alarm for one of the first and second geolocation devices when the determined deviation value exceeds the alarm statistical threshold, so as to exclude positioning information from the first or second geolocation device for which the malfunction alarm is raised from computing a geolocation position of the moving platform, the computation of a deviation statistic including computing a variance matrix representative of the deviation statistic, and the alarm statistical threshold being such that in the absence of a malfunction on said first and second geolocation devices, the probability of a computed deviation value exceeding said alarm statistical threshold is lower than said first probability.

2. The integrity verification method according to claim 1, wherein the positioning information for each geolocation device includes:

an instantaneous position vector computed by said geolocation device, an error variance matrix on the computed spatial positions, a weighted observation matrix associated with satellites used to compute position vectors, and for each satellite used to compute said position vector, a value representative of the error standard deviation over a distance between said geolocation device and said satellite.

3. The integrity verification method according to claim 2, wherein the positioning information for each geolocation device includes data making it possible to determine, for each satellite, an error standard deviation specific to the geolocation device and an error standard deviation shared by all of the geolocation devices, the error standard deviation over a distance between said geolocation device and said satellite being computed based on said specific error standard deviations and shared error standard deviations.

4. The integrity verification method according to claim 3, wherein said variance matrix representative of a deviation statistic between the first position vector computed by the first geolocation device and the second position vector computed by the second geolocation device is computed using the formula:

$$P_{DIFF}(m,n) = P_m + P_n - P_m H_{m,c}^T \Delta H_{n,c} P_n - P_n H_{n,c}^T \Delta H_{m,c} P_m$$

wherein:

$P_m$ is the error variance matrix on the spatial positions computed for the first geolocation device and $P_n$ is the error variance matrix on the spatial positions computed for the second geolocation device, $H_{m,c}$ is the observation matrix of the shared satellites for the first geolocation device and $H_{n,c}$ is the observation matrix of the shared satellites for the second geolocation device, and $\Delta$ is a diagonal matrix whose terms are defined by:

$$\Delta(j,j) = \frac{\sqrt{\sigma_{comp,m}^2(j) - \sigma_{D,m}^2(j)}\sqrt{\sigma_{comp,n}^2(j) - \sigma_{D,n}^2(j)}}{\sigma_{comp,m}(j)\sigma_{comp,n}(j)}$$

Where $\sigma_{comp,m}(j)$ is the value representative of the error standard deviation over a distance between the first geolocation device and a satellite identified by an index j, $\sigma_{comp,n}(j)$ is the value representative of the error standard deviation over a distance between the second geolocation device and a satellite identified by an index j, $\sigma_{D,m}(j)$ is a value representative of the standard deviation of the error specific to the first geolocation device, over a distance between the first geolocation device and a satellite identified by an index j, $\sigma_{D,n}(j)$ is a value representative of the standard deviation of the error specific to the second geolocation device, over a distance between the second geolocation device and a satellite identified by an index j, said satellite with index j being shared by said first and second geolocation devices.

5. The integrity verification method according to claim 3, wherein, when said first and second geolocation devices use a same set of satellites, said variance matrix representative of a deviation statistic between the first position vector computed by the first geolocation device and the second position vector computed by the second geolocation device is computed using the formula:

$$P_{DIFF}(m,n) = P_m H_m^T D_m H_m P_m + P_n H_n^T D_n H_n P_n$$

wherein:

$P_m$ is the error variance matrix on the spatial positions computed for the first geolocation device and $P_n$ is the error variance matrix on the spatial positions computed for the second geolocation device, $H_m$ is the weighted observation matrix for the first geolocation device and $H_n$ is the weighted observation matrix for the second geolocation device, $D_m$ is a diagonal matrix, associated with the first geolocation device, whose terms are defined by:

$$D_m(i,i) = \frac{\sigma_{D,m}^2(i)}{\sigma_{comp,m}^2(i)}$$

Where $\sigma_{comp,m}(i)$ is the value representative of the error standard deviation over a distance between the first geolocation device and a satellite identified by an index i, $\sigma_{D,m}(i)$ is a value representative of the standard deviation of the error specific to the first geolocation device, over a distance between the first geolocation device and a satellite identified by an index i, $D_n$ is a diagonal matrix, associated with the second geolocation device, whose terms are defined by:

$$D_n(i,i) = \frac{\sigma_{D,n}^2(i)}{\sigma_{comp,n}^2(i)}.$$

$\sigma_{comp,n}(i)$ is the value representative of the error standard deviation over a distance between the second geolocation device and a satellite identified by an index i, $\sigma_{D,n}(i)$ is a value representative of the standard deviation of the error specific to the second geolocation device, over a distance between the second geolocation device and a satellite identified by an index i.

6. The integrity verification method according to claim 2, wherein the positioning information further includes, for each geolocation device, a set of identifiers of the satellites used by said geolocation device.

7. The integrity verification method according to claim 6, comprising, for each of said first and second geolocation devices, a step for extracting an observation matrix of the shared satellites from the corresponding weighted observation matrix, as a function of the identifiers of the satellites used both by the first geolocation device and the second geolocation device, said identifiers being obtained from respective identifier assemblies contained in the positioning information.

8. The integrity verification method according to claim 1, wherein the alarm statistical threshold is computed as a function of a Gaussian distribution probability centered on the deviation between position vectors computed with no malfunction of said first and second geolocation devices.

9. The integrity verification method according to claim 1, wherein each of the geolocation devices having an associated true position vector, further comprising a step for computing an integrity radius, for at least one of the geolocation devices of the pair of geolocation devices, called processed geolocation device, for which a probability of malfunction or failure is known, said integrity radius being such that the probability of the deviation, for the chosen components, between the true position vector and the position vector computed by said processed geolocation device being above said radius, is below a second determined probability.

10. The integrity verification method according to claim 9, wherein the computation of an integrity radius includes computing an intermediate radius, depending on the computed alarm statistical threshold and a first distance such that in the absence of malfunction on the other geolocation device of the pair of geolocation devices, the probability of having a deviation, for the selected components, between the true position vector and the position vector computed by said other geolocation device of the pair of geolocation devices, greater than said first distance, is lower than the second probability divided by the failure probability of the processed geolocation device.

11. The integrity verification method according to claim 10, wherein the computation of the integrity radius includes selecting the maximum between said intermediate radius and a second distance, such that when there is no failure on the processed geolocation device, the probability of having a deviation, for the selected components, between the true position vector and the position vector computed by said processed geolocation device, greater than said second distance, is lower than the second probability.

12. A device for verifying the integrity of position vector information obtained by at least two satellite geolocation devices carried by a moving platform, the position vector information being used for calculating a geolocation position of the moving platform, the geolocation position being used for navigating the moving platform, each of the geolocation devices being able to receive a plurality of radio signals from a plurality of separate satellites, and to use the received radio signals to compute a position vector of said geolocation device, including position coordinates computed in a predetermined spatial reference at a given moment in time, each of the geolocation devices being independent of the other geolocation devices, the satellites used being able to be different from one geolocation device to the next, the verification device comprising, for at least one pair of considered geolocation devices made up of a first geolocation device and a second geolocation device, modules suitable for:

obtaining, for each of the geolocation devices of said pair of geolocation devices, a set of positioning information, computing, using the information positioning assemblies respectively associated with the first geolocation device and the second geolocation device, a deviation statistic between a first position vector computed by the first geolocation device and a second position vector computed by the second geolocation device, computing an alarm statistical threshold based on the deviation statistic and a first predetermined probability, determining a deviation value between at least part of the components extracted from the first computed position vector and the second computed position vector, comparing the determined deviation value to the alarm statistical threshold, and raising a malfunction alarm for one of the first and second geolocation devices when the determined deviation value exceeds the alarm statistical threshold, so as to exclude positioning information from the first or second geolocation device for which the malfunction alarm is raised from computing a geolocation position of the moving platform, the module for computing a deviation statistic being capable of computing a variance matrix representative of the deviation statistic, the alarm statistical threshold being such that in the absence of a malfunction on said first and second geolocation devices, the probability of a computed deviation value exceeding said alarm statistical threshold is lower than said first probability.

* * * * *